United States Patent
Ta et al.

(10) Patent No.: US 12,281,047 B2
(45) Date of Patent: Apr. 22, 2025

(54) LOW TEMPERATURE CO-FIRED DIELECTRIC MATERIAL AND PREPARATION METHOD THEREOF

(71) Applicant: GUANGDONG FENGHUA ADVANCED TECHNOLOGY HOLDING CO., LTD., Guangdong (CN)

(72) Inventors: Shiwo Ta, Guangdong (CN); Xiaozhou Wang, Canberra (AU); Tao Chen, Guangdong (CN); Yun Liu, Canberra (AU); Terry James Frankcombe, Canberra (AU); Zhenxiao Fu, Guangdong (CN); Xiuhua Cao, Guangdong (CN); Chunyuan Hu, Guangdong (CN)

(73) Assignee: GUANGDONG FENGHUA ADVANCED TECHNOLOGY HOLDING CO., LTD., Zhaoqing (CN)

( * ) Notice: Subject to any disclaimer, the term of this patent is extended or adjusted under 35 U.S.C. 154(b) by 954 days.

(21) Appl. No.: 17/246,742

(22) Filed: May 3, 2021

(65) Prior Publication Data
US 2021/0309578 A1    Oct. 7, 2021

Related U.S. Application Data

(63) Continuation-in-part of application No. PCT/CN2020/082252, filed on Mar. 31, 2020.

(30) Foreign Application Priority Data

Mar. 25, 2020 (CN) .......... 202010221314.X

(51) Int. Cl.
C04B 35/488    (2006.01)
C04B 35/14    (2006.01)
(Continued)

(52) U.S. Cl.
CPC ............ C04B 35/488 (2013.01); C04B 35/14 (2013.01); C04B 35/624 (2013.01);
(Continued)

(58) Field of Classification Search
CPC ................ C04B 35/6261; C04B 35/64; C04B 2235/3201; C04B 2235/3208;
(Continued)

(56) References Cited

U.S. PATENT DOCUMENTS 5,079,194 A * 1/1992 Jean ............... H01B 3/085
                                                    257/E23.009

FOREIGN PATENT DOCUMENTS

| CN | 102093031 B | * | 1/2013 |
| CN | 110256060 A | | 9/2019 |
| CN | 110436894 A | | 11/2019 |

OTHER PUBLICATIONS

CN102093031 machine translation (Year: 2013).*
(Continued)

*Primary Examiner* — Bryan D. Ripa
*Assistant Examiner* — Cameron K Miller

(57) ABSTRACT

Disclosed is a low temperature co-fired dielectric material with an adjustable dielectric constant, wherein it comprises a zirconia main phase and a silicon-based amorphous filler, a weight ratio of the zirconia main phase to the silicon-based amorphous filler is 40-65:35-60; a weight percentage of $SiO_2$ in the silicon-based amorphous filler is ≥50%. The dielectric constant of low temperature co-fired dielectric material can be continuously adjusted in a wide range of 7-12, the dielectric loss can be as low as 0.1% at 1 MHz. The material system can be sintered at 800-900° C. and co-fired with silver electrode. It can be used as the low temperature co-fired dielectric material. The invention also discloses a
(Continued)

Percentage of zirconia in the raw material (%)

method for preparing the low temperature co-fired dielectric material with an adjustable dielectric constant.

8 Claims, 2 Drawing Sheets

(51) Int. Cl.
C04B 35/624 (2006.01)
C04B 35/626 (2006.01)
C04B 35/64 (2006.01)

(52) U.S. Cl.
CPC .......... *C04B 35/6261* (2013.01); *C04B 35/64* (2013.01); *C04B 2235/3201* (2013.01); *C04B 2235/3208* (2013.01); *C04B 2235/3244* (2013.01); *C04B 2235/3409* (2013.01); *C04B 2235/3418* (2013.01); *C04B 2235/5436* (2013.01); *C04B 2235/5445* (2013.01); *C04B 2235/656* (2013.01)

(58) Field of Classification Search
CPC .... C04B 2235/3244; C04B 2235/3418; C04B 2235/5436; C04B 2235/5445; C04B 2235/656
See application file for complete search history.

(56) References Cited

OTHER PUBLICATIONS

Liu, Ming, et al. "Effects of various fillers on sintering, microstructures and properties of Ca—Ba—Al—B—Si—O glass/ceramic composites." Journal of Central South University 21.3 (2014): 843-848. (Year: 2014).*

Xuewei Gong, Research on Thermal Properties of Glass/ceramic Composite Substrate Materials of LTCC, Chinese Master's Theses Full-text Database, Engineering Science and Technology I, Dec. 15, 2013, pp. 30-31, No. S2.

* cited by examiner

LOW TEMPERATURE CO-FIRED DIELECTRIC MATERIAL AND PREPARATION METHOD THEREOF

CROSS-REFERENCE TO RELATED APPLICATIONS

The present application is a Continuation-In-Part Application of PCT application No. PCT/CN2020/082252 filed on Mar. 31, 2020, which claims the benefit of Chinese Patent Application No. 202010221314.X filed on Mar. 25, 2020, the contents of which are hereby incorporated by reference.

FIELD OF THE INVENTION

The present invention relates to ceramic materials, in particular, to a low temperature co-fired dielectric material with an adjustable dielectric constant, and a method of preparing the same.

BACKGROUND OF THE INVENTION

With the development of semiconductor technology, the packaging of active components has been rapidly developed. However, in actual devices, the number of passive components (capacitors, inductors, etc.) is usually at least ten times more than that of active components. Such a large number of passive components restricts the development of device miniaturization. Low temperature co-fired ceramic (LTCC) technology has become the most promising passive component packaging technology due to the unique three-dimensional structure of its products. Common LTCC materials are mainly based on a glass-ceramic system and a glass ceramic composite system. Current researches on zirconia in LTCC materials mainly focus on the glass-ceramic system; that is, zirconia is used as a nucleating agent to control the crystallization of glass. The amount of zirconia added to different glass compositions is usually 1-10%, and there is generally an optimal value. Deviation from this optimal value will cause degradation of significant performance, such as wastage, which is a key index of ceramic materials; in order to ensure better overall performance, the composition ratio of ceramic materials will be relatively fixed, so the dielectric constant of a sample is relatively fixed. For the glass ceramic composite system, the glass is mainly used to reduce the sintering temperature, while the ceramic material mainly determines the properties after sintering. I. Choi et al. have tried to co-fire $ZrO_2$ (as a ceramic filler material) and calcium aluminum borosilicate glass (as a main phase, prepared by the melt-quenching method); the product obtained has a dielectric constant of about 9, and its dielectric loss is relatively high (tan $\delta$=0.006). In summary, although some researchers have studied and investigated the application of zirconia in LTCC, the materials from these studies have relatively fixed dielectric constants; furthermore, due to the presence of a large amount of high-x compositions in the glass phase, the dielectric constant of the whole material system cannot be continuously adjusted. An integrated module of LTCC materials often contains materials with different dielectric constants. When these materials are based on different material systems, defects, such as laminar cracks and warping, will occur during co-firing as a result of their different sintering characteristics. On the other hand, if a composition that is based on one material system and has adjustable dielectric constants can be developed, such problems can be effectively alleviated. In addition, in the current LTCC materials based on glass ceramic composites, the glass is almost all made by the melt-quenching method. This method has two main drawbacks: one is that the evaporation of some volatile components, such as $B_2O_3$ and $Bi_2O_3$, in the glass causes the composition of the glass powder obtained to be different from the original design; this impairs the performance of the final product. The other is that this method is not suitable for preparing some kinds of glass, such as $CaO$—$SiO_2$ glass.

SUMMARY OF THE INVENTION

The objective of the present invention is to overcome deficiencies of the prior art and to provide a low temperature co-fired dielectric material with an adjustable dielectric constant, and a method of preparing the same.

The present invention provides a low temperature co-fired dielectric material with an adjustable dielectric constant, wherein it comprises a zirconia main phase and a silicon-based amorphous filler, a weight ratio of the zirconia main phase to the silicon-based amorphous filler is 40-65:35-60; a weight percentage of $SiO_2$ in the silicon-based amorphous filler is ≥50%.

The tunability of the dielectric constant of the low temperature co-fired dielectric material composed of the zirconia main phase and the silicon-based amorphous filler is enhanced; the dielectric constant can be adjusted between 7 and 12.

Preferably, the low temperature co-fired dielectric material comprises the following components in percentage by weight: $ZrO_2$ 40-65%, $SiO_2$ 27.03-46.33%, $Na_2O$ 0.27-0.46%, $K_2O$ 1.23-2.11%, $CaO$ 0.73-1.26% and $B_2O_3$ 5.73-9.83%. The material system has similar firing properties, hence lamellar cracks, warping and other defects during co-firing can be avoided.

Preferably, the zirconia main phase is crystalline or amorphous. The dielectric constants of monoclinic $ZrO_2$ (~20) and amorphous $ZrO_2$ (~22) are close to each other. and the dielectric constant of the low temperature co-fired dielectric material can be adjusted between 7 and 12 by choosing either one or both of monoclinic $ZrO_2$ and amorphous $ZrO_2$.

Preferably, the silicon-based amorphous filler is glass or a mixture of amorphous materials. The use of the silicon-based amorphous phase obviates the need for a high-temperature melting process; the volatilization of $B_2O_3$ can be thus avoided.

Preferably, the silicon-based amorphous filler has an atomic ratio of Na:K=1:2-4. The dielectric loss of the low temperature co-fired dielectric materials can be reduced under the above ratio.

Preferably, Al element in the silicon-based amorphous filler has a weight percentage of less than or equal to 0.01%.

Preferably, the $ZrO_2$ has a particle size ranging from 0.5 µm to 10 µm. When the particle size of $ZrO_2$ is within this range, the specific surface area of $ZrO_2$ particles is desirable, and the preparation of the low temperature co-fired dielectric materials with an adjustable dielectric constant can be achieved. Preferably, the $ZrO_2$ has a particle size ranging from 1 µm to 5 µm.

The silicon-based amorphous filler can be prepared by mixing a number of components, or by a wet chemical method.

Preferably, the silicon-based amorphous filler is prepared by steps of

S1: dissolving ethyl orthosilicate in a mixture of alcohol and deionized water to obtain a solution;

S2: adjusting the pH of the solution to 1-3;

S3: adding a salt of an element present in a glass powder to the solution; heating the solution at 60-80° C. and stirring thoroughly; and S4: adjusting the pH of the solution to 6-8 to obtain a gel; drying the gel and calcinating at 600-750° C. to obtain the silicon-based amorphous filler.

The composition of the glass prepared by the traditional melt-quenching process often deviates from the original design. This is mainly due to the volatilization of some volatile components in the glass, such as $B_2O_3$ and $Bi_2O_3$, during high temperature melting. The silicon-based amorphous filler can be synthesized at a low temperature (~700° C.) using the above method. This effectively prevents the volatilization of these components; as a result, the composition of the silicon-based amorphous fillers synthesized is closer to the original design.

The salt of an element other than silicon involved in the preparation of the silicon-based amorphous filler is preferably a soluble salt, for example, a nitrate salt and/or an acetate salt of Na, K, Ca and B.

Preferably, in S1, a volume ratio of ethyl orthosilicate to alcohol to deionized water is 1 to 5-15 to 1.

In another aspect of the invention, the application provides a method for preparing the low temperature co-fired dielectric material, wherein the method comprises mixing the silicon-based amorphous filler and zirconia main phase, performing ball-milling for 6-24 hours; and sintering at 800-900° C. to obtain the low temperature co-fired dielectric material.

The advantages according to the present invention are as follows:

the invention provides a low temperature co-fired dielectric material with an adjustable dielectric constant. By controlling the ratio of the zirconia main phase to the silicon-based amorphous phase filler, the dielectric constant of the material obtained can be adjusted within a wide range of 7-12, and the dielectric loss can be as low as 0.1% at 1 MHz. The material system can be sintered at 800-900° C., and can be co-fired with a silver electrode. The material can be used as a low temperature co-fired dielectric material.

BRIEF DESCRIPTION OF THE DRAWINGS

FIG. 2(*b*) is a diagram showing the silver content at the points shown in FIG. 2(*a*).

DETAILED DESCRIPTION OF PREFERRED EXAMPLES

In order to better illustrate the objective, technical solutions and advantages of the present invention, the present invention will be further described below through specific examples.

Example 1

An example of the method for preparing the low temperature co-fired dielectric material of the present invention includes the following steps:

9.3 mL ethyl orthosilicate was dissolved in a mixture of alcohol (100 mL) and deionized water (9.3 mL); to facilitate hydrolysis, nitric acid was added to adjust the pH of the solution to about 1 with stirring. After the solution turned clear, 0.07 g $NaNO_3$, 0.24 g $KNO_3$, 0.28 g $Ca(NO_3)_2 \cdot 4H_2O$ and 0.92 g of a $HBO_3$ solution were added to the solution, stirred vigorously, and heated at 75° C. Then, ammonia water was added to adjust the pH to about 7 to form a gel. After drying the gel obtained, it was calcined at 700° C. for 2 h to obtain a silicon-based amorphous filler. Finally, 49.81% of $ZrO_2$ (particle size is 5 μm) and 50.19% of the silicon-based amorphous filler were weighed, and were ground and mixed at the ball mill for 18 hours. After drying, the mixture was pressed into a sheet at 7 MPa and sintered at 850° C. to obtain the low temperature co-fired ceramic material.

Figure 1:
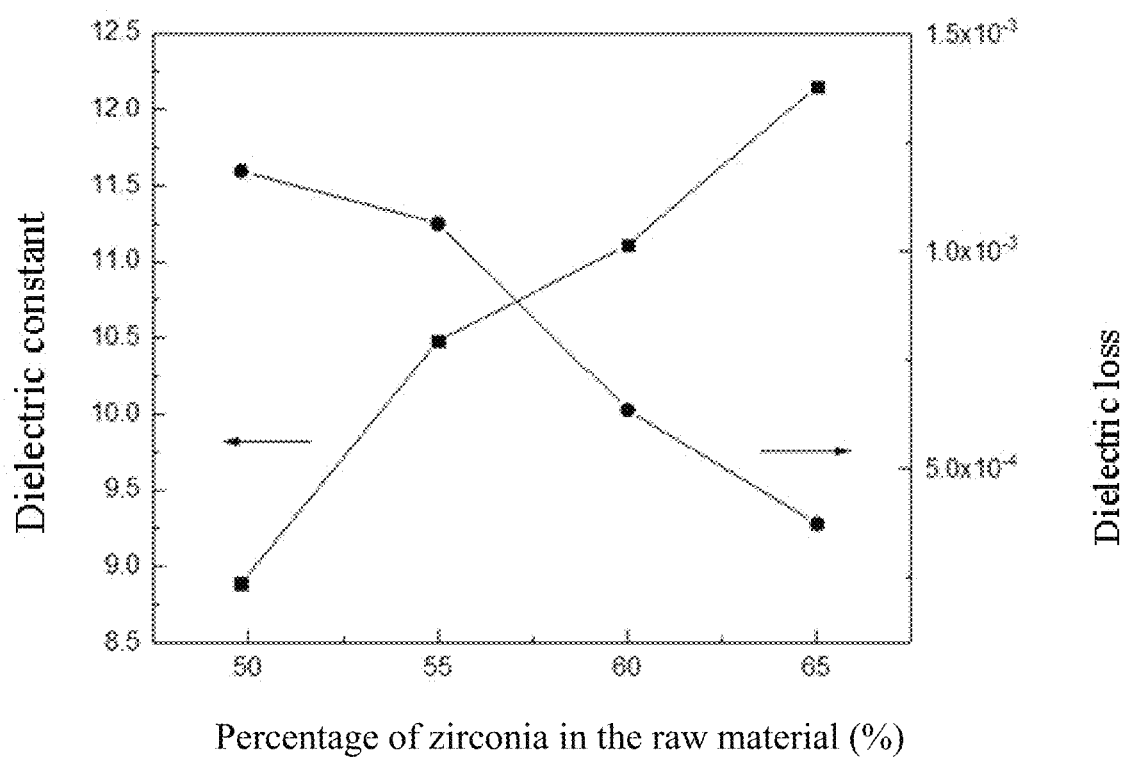
FIG. 1 is a diagram showing the dielectric properties of the samples described in Examples 1-4 (at 1 MHz).

The dielectric properties of the low temperature co-fired dielectric material prepared in this example are shown in FIG. 1. The dielectric constant was 8.89 at 1 MHz, the dielectric loss was 0.0012 at 1 MHz. The low temperature co-fired dielectric material described in this example was tightly bonded to a silver electrode after co-firing. No delamination, warpage, etc. occurred.

Example 2

An example of the method for preparing the low temperature co-fired dielectric material of the present invention includes the following steps:

9.3 mL ethyl orthosilicate was dissolved in a mixture of alcohol (100 mL) and deionized water (9.3 mL); to facilitate hydrolysis, nitric acid was added to adjust the pH of the solution to about 1 with stirring. After the solution turned clear, 0.07 g $NaNO_3$, 0.24 g $KNO_3$, 0.28 g $Ca(NO_3)_2 \cdot 4H_2O$ and 0.92 g of a $HBO_3$ solution were added to the solution, stirred vigorously, and heated at 80° C. Then, ammonia water was added to adjust the pH to about 7 to form a gel. After drying the gel obtained, it was calcined at 700° C. for 2 h to obtain a silicon-based amorphous filler. Finally, 55% of $ZrO_2$ (particle size is 5 μm) and 45% of the silicon-based amorphous filler were weighed, and were ground and mixed at the ball mill for 15 hours. After drying, the mixture was pressed into a sheet at 7 MPa and sintered at 850° C. to obtain the low temperature co-fired ceramic material.

The dielectric properties of the low temperature co-fired dielectric material prepared in this example are shown in FIG. 1. The dielectric constant was 10.48 at 1 MHz, the dielectric loss was 0.0011 at 1 MHz. The low temperature co-fired dielectric material described in this example was tightly bonded to a silver electrode after co-firing. No delamination, warpage, etc. occurred.

Example 3

An example of the preparation method of the low temperature co-fired dielectric material of the present invention includes the following steps:

9.3 mL ethyl orthosilicate was dissolved in a mixture of alcohol (100 mL) and deionized water (9.3 mL); to facilitate hydrolysis, nitric acid was added to adjust the pH of the solution to about 1 with stirring. After the solution turned clear, 0.07 g $NaNO_3$, 0.24 g $KNO_3$, 0.28 g $Ca(NO_3)_2 \cdot 4H_2O$ and 0.92 g of a $HBO_3$ solution were added to the solution, stirred vigorously, and heated at 60° C. Then, ammonia water was added to adjust the pH to about 7 to form a gel. After drying the gel obtained, it was calcined at 700° C. for 2 h to obtain a silicon-based amorphous filler. Finally, 60% of $ZrO_2$ (particle size is 5 μm) and 40% of the silicon-based amorphous filler were weighed, and were ground and mixed at the ball mill for 16 hours. After drying, the mixture was pressed into a sheet at 7 MPa and sintered at 850° C. to obtain the low temperature co-fired ceramic material.

The dielectric properties of the low temperature co-fired dielectric material prepared in this example are shown in FIG. 1. The dielectric constant was 11.11 at 1 MHz, the dielectric loss was 0.0006 at 1 MHz.

Figure 2A:
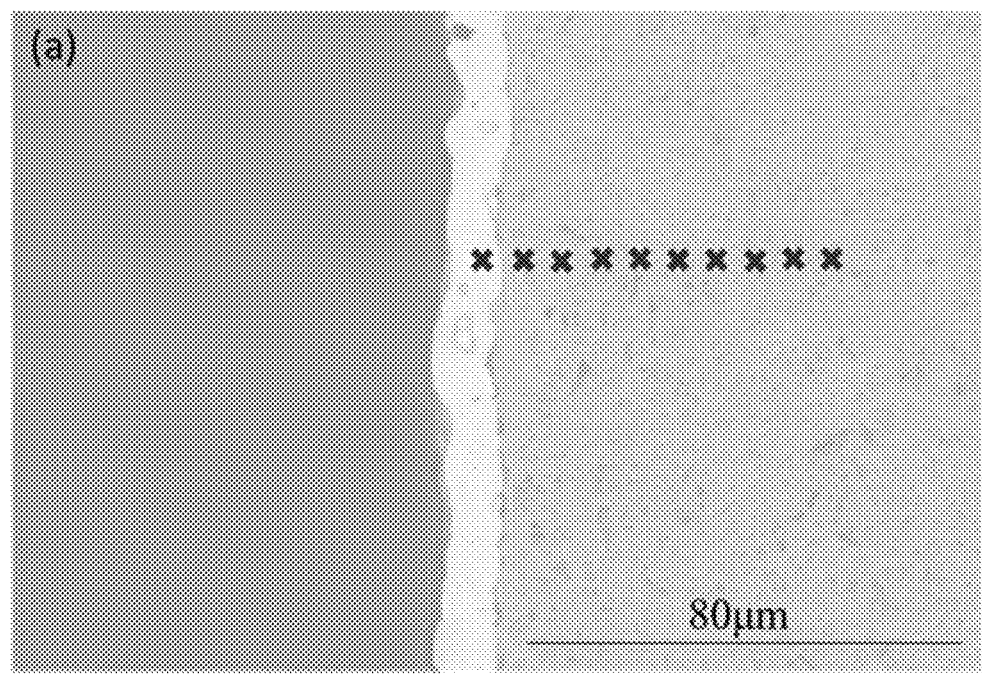
FIG. 2(*a*) is the SEM image of a cross-section of the green sheet formed by dry pressing of the silver electrode and powder in example 3 after co-firing at 850° C.
Figure 2B:
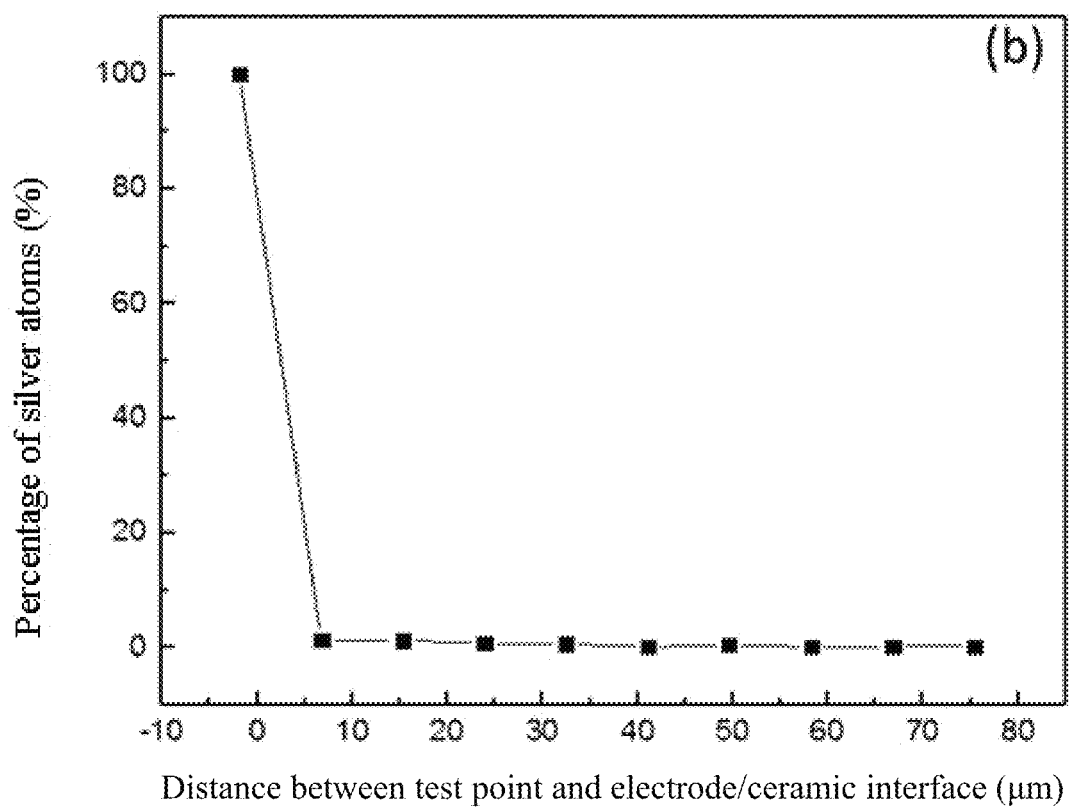

In order to examine the compatibility of the material with a silver electrode in co-firing, we used a 5% polyvinyl butyral (PVB) solution to granulate the powdered mixture of zirconia and glass after ball milling. The mixture was then dry pressed into a sheet at 7 MPa and the surface of the sheet was coated with the silver electrode. Finally, the sheet was sintered at 850° C. FIG. 2(a) is the SEM image of a cross section of the silver electrode and the green sheet after co-firing, and it could be seen that the silver electrode and the ceramic were tightly bonded without delamination or cracks. FIG. 2(b) shows that the silver content dropped sharply at the silver electrode/ceramic interface, indicating that no diffusion occurred during firing.

Example 4

An example of the preparation method of the low temperature co-fired dielectric material of the present invention includes the following steps:

9.3 mL ethyl orthosilicate was dissolved in a mixture of alcohol (100 mL) and deionized water (9.3 mL); to facilitate hydrolysis, nitric acid was added to adjust the pH of the solution to about 1 with stirring. After the solution turned clear, 0.07 g $NaNO_3$, 0.24 g $KNO_3$, 0.28 g $Ca(NO_3)_2 \cdot 4H_2O$ and 0.92 g of a $HBO_3$ solution were added to the solution, stirred vigorously, and heated at 60° C. Then, ammonia water was added to adjust the pH to about 7 to form a gel. After drying the gel obtained, it was calcined at 700° C. for 2 h to obtain a silicon-based amorphous filler. Finally, 65% of $ZrO_2$ (particle size is 5 μm) and 35% of the silicon-based amorphous filler were weighed, and were ground and mixed at the ball mill for 15 hours. After drying, the mixture was pressed into a sheet at 7 MPa and sintered at 850° C. to obtain the low temperature co-fired ceramic material.

The dielectric properties of the low temperature co-fired dielectric material prepared in this example are shown in FIG. 1. The dielectric loss was 0.0004 at 1 MHz. The low temperature co-fired dielectric material described in this example was tightly bonded to a silver electrode after co-firing. No delamination, warpage, etc. occurred.

Hereinbefore described are only preferred examples of the present invention. It should be noted that any modification or improvement carried out by those skilled in the art within the spirit of the present invention should be regarded as within the scope of protection of the present invention.

What is claimed is:

1. A low temperature co-fired dielectric material, wherein the low temperature co-fired dielectric material consists of a zirconia main phase and a silicon-based amorphous filler, a weight ratio of the zirconia main phase to the silicon-based amorphous filler is (40-65):(35-60); a weight percentage of $SiO_2$ in the silicon-based amorphous filler is ≥50%;
   wherein the low temperature co-fired dielectric material consists of the following components in percentage by weight: $ZrO_2$ 40-65%, $SiO_2$ 27.03-46.33%, $Na_2O$ 0.27-0.46%, $K_2O$ 1.23-2.11%, CaO 0.73-1.26% and $B_2O_3$ 5.73-9.83%, and a total percentage of the components listed by weight is 100%;
   wherein the low temperature co-fired dielectric material has a dielectric constant ranging from 7 to 12.

2. The low temperature co-fired dielectric material according to claim 1, wherein the zirconia main phase is crystalline or amorphous.

3. The low temperature co-fired dielectric material according to claim 1, wherein the silicon-based amorphous filler consists of $SiO_2$, $Na_2O$, $K_2O$, CaO and $B_2O_3$, and has an atomic ratio of Na:K=1:(2-4).

4. The low temperature co-fired dielectric material according to claim 1, wherein an Al element in the silicon-based amorphous filler has a weight percentage of less than or equal to 0.01%.

5. The low temperature co-fired dielectric material according to claim 1, wherein the $ZrO_2$ has a particle size ranging from 0.5 μm to 10 μm.

6. The low temperature co-fired dielectric material according to claim 1, wherein the silicon-based amorphous filler is prepared by steps of
   S1: dissolving ethyl orthosilicate in a mixture of alcohol and deionized water to obtain a solution;
   S2: adjusting the pH of the solution to 1-3;
   S3: adding a salt of an element present in the silicon-based amorphous filler to the solution; heating the solution at 60-80° C. and stirring thoroughly; and
   S4: adjusting the pH of the solution to 6-8 to obtain a gel; drying the gel and calcinating at 600-750° C. to obtain the silicon-based amorphous filler.

7. The low temperature co-fired dielectric material according to claim 6, wherein in S1, a volume ratio of ethyl orthosilicate to alcohol to deionized water is 1 to (5-15) to 1.

8. The low temperature co-fired dielectric material according to claim 5, wherein the $ZrO_2$ has a particle size ranging from 1 μm to 5 μm.

* * * * *